Dec. 8, 1931.  G. A. CHAUSTOWICH  1,835,593
BRAKE
Filed Dec. 13, 1928   2 Sheets-Sheet 1

INVENTOR.
Gabriel A. Chaustowich
BY
ATTORNEY.

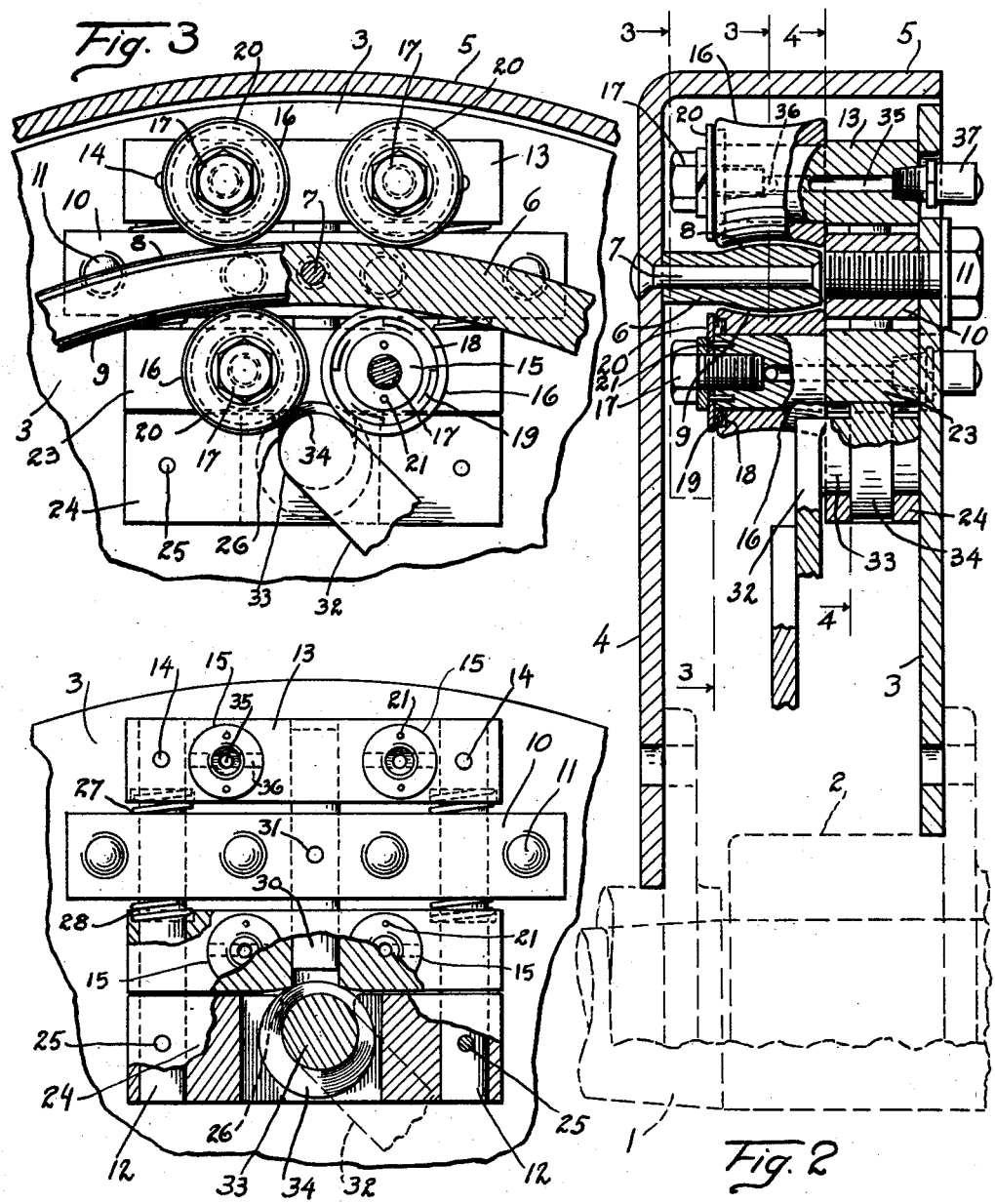

Patented Dec. 8, 1931

1,835,593

UNITED STATES PATENT OFFICE

GABRIEL A. CHAUSTOWICH, OF DETROIT, MICHIGAN

BRAKE

Application filed December 13, 1928. Serial No. 325,670.

This invention relates to brakes with special reference to a brake construction applicable for automotive vehicles.

The object of the invention is to provide a brake construction or mechanism which will be efficient in operation and in which the elements which produce the braking action or retarding action are designed and co-ordinated with each other so that there is no appreciable wear on these parts, thus having a brake mechanism life as long as or longer than the life of the vehicle. More specifically, the brake construction comprises clamping rollers designed to clamp another relatively movable part, and both the rollers and this movable part may be constructed of suitable metal. It is appreciated that a brake employing a compression roller or compression rollers is not broadly new, but the present invention involves an arrangement of parts which not only gives better and new results, but in which the action and construction makes feasible the use of clamping rollers for vehicle brakes.

In the accompanying drawings:

Fig. 2 is an enlarged section taken on line 2—2 of Fig. 1.

Fig. 3 is a sectional view taken on line 3—3 of Fig. 2.

Fig. 4 is a section taken on the line 4—4 of Fig. 2.

Figure 1:
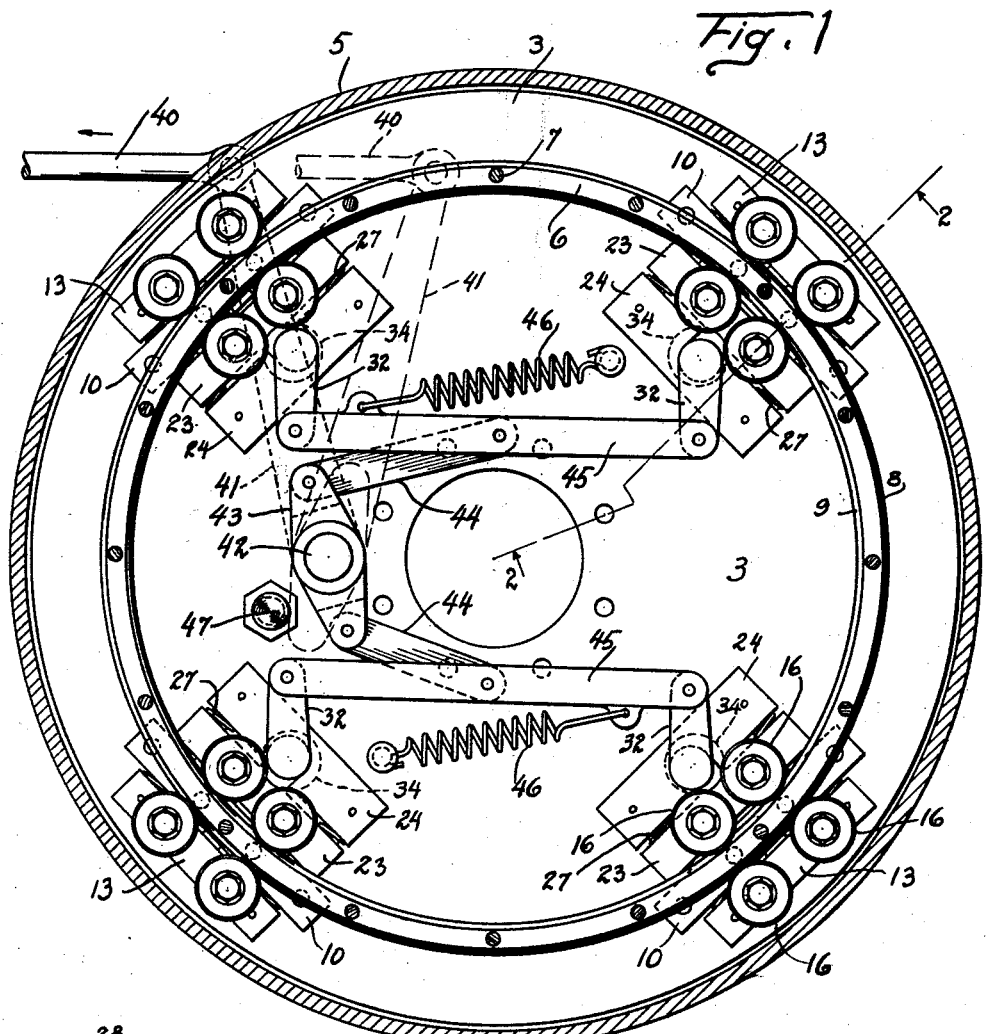
Fig. 1 is a sectional view taken through the brake drum of an automotive vehicle, illustrating the brake construction.

Referring now to the drawings in more detail, the axle of the vehicle will be seen at 1, and the housing for this axle as at 2 (Fig. 2) carries the usual backing plate 3. A brake drum is referenced 4 and it has the usual peripheral portion 5 which overlies the backing plate 3 so as to enclose the brake construction now to be described. The drum is carried by the vehicle wheel, whereas the backing plate 3 is held in a stationary manner by the housing of the axle. This construction is quite well known, and no further description is necessary.

Within the drum is a ring member 6 which is secured to the drum, and accordingly rotates therewith. The ring may be secured to the drum by means of a number of securing devices, such as rivets 7. This ring is positioned at a suitable point intermediate the axis and periphery of the drum in order that braking rollers can engage with this ring in opposite sides thereon. The ring has opposed surfaces which are preferably curved as shown at 8 and 9 for engagement with the rollers having curved surfaces.

The pressure rollers are arranged in unit groups, and a number of units are placed within the braking drum, and, as shown in Fig. 1, four of such units are utilized, although this number may be varied if desired. The units are identical, so a description of one will suffice for all. Taking up the unit in detail, it will be noted by reference to Fig. 4 that the unit consists of a block 10 which is secured as by means of suitable bolts 11 to the backing plate 3. Extending through this block are a pair of guide rods 12. These guide rods are slidably received in apertures in the block 10.

Figure 5:
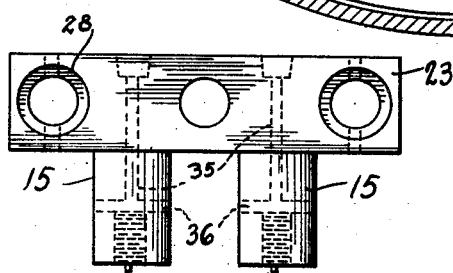
Fig. 5 is a top plan view of one of the roller-carrying members.

Secured to these guide rods, is, near one end thereof, a cross member 13 which is fixed to the guide rods as by means of pins 14. This cross member may advantageously be of a single forging provided with studs 15 (Fig. 5) integral with the body of the cross member for receiving each a roller 16. The rollers nicely fit upon the studs so as to rotate thereon and are held in place by a suitable screw 17 which is threaded into the stud.

It is desirable to retain the rollers with some degree of tenseness to prevent rattling, while at the same time permit their rotation. For this purpose the rollers may be recessed as at 18, (Fig. 2) and in this recess is a spring washer 19. A suitable washer 20 is placed between the head of the screw 17 and the rollers. This washer is of sufficient diameter to retain the spring in the recessed part 18. The stud preferably is provided with apertures for receiving pins 21 carried by the washer 20 so that the washer is held from rotation. It will be seen by this construction that the screw 17 may be tightened and the washer abuts against the end of the stud so that the roller is not bound.

On the opposite side of the block 10 there is disposed a cross member 23 similar to the cross member 13, but the guide rods 12 freely slide through apertures in this member. This member also may be of a single forging and provided with studs for receiving a pair of rollers.

A cross head 24 is secured as by means of pins 25 near the ends of the guide rods 12, and the cross head 24 is provided with a notch 26 designed to form a bearing for an operating part. Coiled springs are interposed between the block 10 and the cross members 13 and 23. These coiled springs are referenced 27 and preferably the cross members are recessed as at 28 to house the coiled springs when the same are collapsed.

For the purpose of strengthening the structure, and for guiding the cross members in a movement relative to the block 10, as will soon be described, a pin 30 may be secured as by means of locking pin 31 to the cross head, the ends of which slidably fit in suitable apertures in the cross members 13 and 23.

The operating member may consist of a lever 32 having a stud portion 33 extending at right angles thereto which fits in the notch 26, and this stud portion is provided with a cam element 34. In commercial construction the lever, stud, and cam, may be one integral forging.

The operation of this unit is such that upon actuation of the lever 32, the two sets of rollers, one set of which is carried by cross member 13, and the other set of which is carried by cross member 23, are drawn together. It will be noted that the two sets of rollers are in position on opposite sides of the rings 8. Furthermore, it will be noted that the rollers are concave in form so as to nicely fit the curved surfaces 8 and 9 of the ring 6.

Now, by referring to Figs. 3 and 4, and by visualizing movement of the arm 32 in a clockwise direction, the cam element 34 engages with the cross member 23. Accordingly, the cross member 23 is urged upwardly and this creates a downward pull upon cross member 13, because the cam supporting cross head 24 is securely fixed to the rods 12, as is the cross member 13. This action tends to compress the springs 27, which when collapsed are housed in the recesses 28. Thus the rollers on cross head 23, these being the lowermost rollers illustrated in Fig. 2, move up into contact with the ring 6, while the rollers which are on cross member 13 move down in contact with the ring 6.

The rollers thus oppositely engaging the spring effect a braking action, and, of course, the greater the pressure the more the braking action. At this point the objects of providing the ring and rollers with cooperating concave and convex surfaces may be brought out. When the rollers clamp against the ring these cooperating surfaces tend to line up the parts. Moreover, while in engagement, tend to maintain the alignment. Thus, twisting strains or other strain, which may be set up by the braking action, are overcome, at least in a large measure, by these cooperating surfaces of the rollers and ring inasmuch as they normally tend to hold themselves in direct alignment.

For the purpose of lubricating these rollers, the studs 15 may be drilled with a passageway 35 with cross passageways 36, and suitable fittings 37 for receiving a lubricating gun may be fitted into the studs as shown in Fig. 2.

Another feature, is the disposition of the rollers as regards the axial center of the wheel or brake drum. This is brought out in Fig. 1 wherein it will be noted that each two opposing rollers are disposed on a radial line. This construction provides for a nicety of action in the application of the braking pressure on the ring and more or less balances the various pressures of the several units from a common axial center.

As set forth above, the requisite number of such units may be used on a single wheel, and as shown in Fig. 1, four of such units are utilized. The operating construction for simultaneously operating these units, consists of the usual brake rod 40 connected by the means of an arm 41 to a rock shaft 42. This rock shaft operates a cross arm 43, to which arms 44 are pivotally connected. There are two arms 44, and each is pivotally connected to an arm 45, which in turn are pivotally connected at their ends with an operating arm 32.

In Fig. 1 the normal brake release position of parts is illustrated by the dotted lines. To actuate the brakes the rod 40 is moved in the direction of the arrow. This movement being from right to left, thus rocking shaft 42, and through the several connections described, actuating the cam arms 32. This action takes place against suitable springs such as tension springs 46, which when the pressure upon rod 40 is removed, it returns the brakes to off position. The coiled springs 27 also aim in this movement, and these coiled springs insure that the rollers of each unit move to off position. For the purpose of stopping the off movement which is effected by the springs, and for stopping the rollers in a given off position, a suitable stop 47 is provided which may be positioned to be engaged by the arm 43. This stop may be made adjustable for this purpose.

Claims:

1. In a brake, the combination of a ring, a supporting block, said ring and block mounted upon relatively movable members, guide rods slidably mounted in the block, a pair of cross members mounted upon the guide rods, a journaled roller on each cross member, and means for moving the cross members toward the supporting block to cause the rollers to engage opposite sides of the ring and effect braking action.

2. In a brake, the combination of a ring, a supporting block, said ring and block mounted upon relatively movable members, guide rods slidably mounted in the block for movement substantially on a radial line as regards the ring, a pair of cross members mounted upon the guide rods, a roller on each cross member, and means for moving the cross members toward the supporting block to cause the rollers to engage opposite sides of the ring and effect braking action.

3. In a brake, the combination of a ring, a supporting block, said ring and block being mounted upon relatively movable members, a pair of guide rods carried by the supporting block, said rods being slidable therein, a cross member fixedly secured to the guide rods, a pair of rollers carried by this cross member, another cross member slidably mounted upon the guide rods, a pair of rollers carried thereby, the said pairs of rollers being positioned on opposite sides of the ring, and means for urging the cross members towards each other to cause the rollers to engage the ring and effect braking action.

4. In a brake, the combination of a ring, a supporting block, said ring and block being mounted upon relatively movable members, a pair of guide rods carried by the supporting block, said rods being slidable therein, a cross member fixedly secured to the guide rods, a pair of rollers carried by this cross member, another cross member slidably mounted upon the guide rods, a pair of rollers carried thereby, the said pairs of rollers being positioned on opposite sides of the ring, a cross head fixedly secured to the guide rods, a cam element journaled in the cross head, and means for actuating the cam element whereby the same draws the cross members together to bring the pairs of rollers into engagement with the opposite sides of the rings to effect braking action.

5. In a brake, the combination of a ring, a supporting block, said ring and block being mounted upon relatively movable members, a pair of guide rods carried by the supporting block, said rods being slidable therein, a cross member fixedly secured to the guide rods, a pair of rollers carried by this cross member, another cross member slidably mounted upon the guide rods, a pair of rollers carried thereby, the said pairs of rollers being positioned on opposite sides of the ring, a cross head fixedly secured to the guide rods, a cam element journaled in the cross head, and means for actuating the cam element whereby the same draws the cross members together to bring the pairs of rollers into engagement with the opposite sides of the rings to effect braking action, and coiled springs on each guide rod positioned between the supporting block and the said cross members.

6. In a brake, the combination of a ring, a supporting block, said ring and block being mounted upon relatively movable members, a pair of guide rods carried by the supporting block, said rods being slidable therein, a cross member fixedly secured to the guide rods, a pair of rollers carried by this cross member, another cross member slidably mounted upon the guide rods, a pair of rollers carried thereby, the said pairs of rollers being positioned on opposite sides of the ring, a cross head fixedly secured to the guide rods, a cam element journaled in the cross head, and means for actuating the cam element, whereby the same draws the cross members together to bring the pairs of rollers into engagement with the opposite sides of the rings to effect braking action, and coiled springs on each guide rod positioned between the supporting block and the said cross members, some of the members between which the coiled springs are disposed being recessed for housing the springs when the same are collapsed.

7. In a brake, the combination of a rotatable brake drum, a ring carried by the drum, a back plate positioned adjacent the drum and being non-rotatable and fixed perpendicularly relative to the axis of the drum, means attached to the back plate, rollers carried by said means, the said means holding the rollers with their axis fixed in parallelism with the axis of the drum, at least some of said rollers and one face of the ring having cooperating concave and convex surfaces, and means for moving the rollers radially so that the rollers on opposite sides of the ring engage it with the cooperating concave and convex surfaces serving to maintain alignment of the axis and the perpendicular position of the backing plate relative to the axis of the drum.

8. In a brake, the combination of a drum having a ring, a back plate, a plurality of separate and spaced roller units carried by the back plate, said units being equally spaced circumferentially of the ring, a plurality of rollers carried by each unit, some positioned on the outside of the ring and some positioned on the inside of the ring, and means for simultaneously moving the inside and outside rollers toward each other and relative to their units to grip the ring between them.

In testimony whereof I affix my signature.
GABRIEL A. CHAUSTOWICH.